(12) United States Patent
Becker et al.

(10) Patent No.: US 11,303,379 B1
(45) Date of Patent: Apr. 12, 2022

(54) COMMUNICATION BETWEEN DATA CENTERS USING A MULTI-CORE FIBER

(71) Applicant: MELLANOX TECHNOLOGIES, LTD., Yokneam (IL)

(72) Inventors: Donald Becker, Hashmonaim (IL); Dimitrios Kalavrouziotis, Papagou (GR); Boaz Atias, Maale Adumim (IL); Itshak Kalifa, Bat Yam (IL); Tamir Sharkaz, Kfar Tavor (IL); Paraskevas Bakopoulos, Ilion (GR); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/160,422

(22) Filed: Jan. 28, 2021

(30) Foreign Application Priority Data

Nov. 5, 2020 (GR) .............................. 20200100668

(51) Int. Cl.
*H04J 14/02* (2006.01)
*H04B 10/2581* (2013.01)
(Continued)

(52) U.S. Cl.
CPC ...... *H04J 14/0257* (2013.01); *H04B 10/2581* (2013.01); *H04J 14/08* (2013.01);
(Continued)

(58) Field of Classification Search
CPC .. H04J 14/0257; H04J 14/08; H04Q 11/0066; H04Q 2213/13295; H04Q 2011/0086; H04B 10/2581
(Continued)

(56) References Cited

U.S. PATENT DOCUMENTS 5,905,838 A    5/1999  Judy et al.
6,976,792 B1  12/2005  Cohen et al.
(Continued)

OTHER PUBLICATIONS

Yinping Liu etal," Graded-index_Seven-core_Fiber_Optimized_for_High_Density_and_Ultra-wideband_Parallel_Transmission_Application" OFC 2018 (Year: 2018).*

(Continued)

*Primary Examiner* — Abbas H Alagheband
(74) *Attorney, Agent, or Firm* — Kligler & Associates Patent Attorneys Ltd

(57) ABSTRACT

A system includes a pair of network devices, a universal multi-core fiber (UMCF) interconnect, and a pair of wavelength-division multiplexing (WDM) devices. Each network device includes (i) first optical communication devices configured to communicate first optical signals having a first carrier wavelength and (ii) second optical communication devices configured to communicate second optical signals having a second carrier wavelength. The universal multi-core fiber (UMCF) interconnect includes multiple cores that are configured to convey the first optical signals and the second optical signals between the network devices, using single-mode propagation for the first optical signals and multi-mode propagation for the second optical signals. Each WDM device is connected between a respective network device and the UMCF interconnect and configured to couple the first and second optical communication devices of the respective network device to the cores in accordance with a defined channel assignment.

18 Claims, 3 Drawing Sheets

(51) Int. Cl.
*H04Q 11/00* (2006.01)
*H04J 14/08* (2006.01)

(52) U.S. Cl.
CPC . *H04Q 11/0066* (2013.01); *H04Q 2011/0086* (2013.01); *H04Q 2213/13295* (2013.01)

(58) Field of Classification Search
USPC .......................................................... 398/48
See application file for complete search history.

(56) References Cited

U.S. PATENT DOCUMENTS

| | | | | |
|---|---|---|---|---|
| 8,355,638 | B2* | 1/2013 | Essiambre | H04J 14/06 398/208 |
| 8,488,921 | B2* | 7/2013 | Doany | G02B 6/43 385/14 |
| 8,503,845 | B2* | 8/2013 | Winzer | G02B 6/02042 385/123 |
| 8,725,001 | B2* | 5/2014 | Fini | H04J 14/00 398/145 |
| 8,811,787 | B2* | 8/2014 | Feuer | H04B 10/2581 385/126 |
| 9,007,681 | B2* | 4/2015 | Zhu | H01S 3/06737 359/341.1 |
| 9,264,171 | B2* | 2/2016 | Chang | H04J 14/04 |
| 9,485,048 | B2* | 11/2016 | Liboiron-Ladouceur | H04J 14/0267 |
| 9,678,270 | B2 | 6/2017 | Bigot et al. | |
| 9,917,672 | B2* | 3/2018 | Jensen | H04B 10/2581 |
| 9,971,111 | B1 | 5/2018 | Hsu | |
| 2003/0021551 | A1 | 1/2003 | Carpenter et al. | |
| 2005/0135732 | A1 | 6/2005 | Crow et al. | |
| 2010/0284691 | A1* | 11/2010 | Zottmann | H04Q 11/0005 398/49 |
| 2011/0141555 | A1* | 6/2011 | Fermann | G02B 6/02009 359/341.1 |
| 2011/0274398 | A1* | 11/2011 | Fini | G02B 6/0365 385/124 |
| 2011/0274435 | A1* | 11/2011 | Fini | H04J 14/025 398/139 |
| 2013/0294737 | A1 | 11/2013 | Dianov et al. | |
| 2014/0037244 | A1* | 2/2014 | Sorin | G02B 6/43 385/28 |
| 2014/0063592 | A1* | 3/2014 | Ip | H01S 3/06754 359/337.1 |
| 2014/0064687 | A1* | 3/2014 | Hoover | G02B 6/02042 385/126 |
| 2014/0125971 | A1* | 5/2014 | Jiang | G01M 11/33 356/73.1 |
| 2015/0050019 | A1* | 2/2015 | Sengupta | G02B 6/3845 398/44 |
| 2015/0078744 | A1* | 3/2015 | Ito | H04B 10/2581 398/43 |
| 2015/0086201 | A1* | 3/2015 | Ryf | H04J 14/04 398/44 |
| 2015/0331181 | A1 | 11/2015 | Chen et al. | |
| 2016/0261351 | A1* | 9/2016 | Raybon | H04B 10/60 |
| 2017/0123146 | A1* | 5/2017 | Chen | G02B 6/032 |
| 2017/0155466 | A1* | 6/2017 | Zhou | H04B 10/2581 |
| 2017/0336559 | A1 | 11/2017 | Bookbinder et al. | |
| 2017/0363823 | A1 | 12/2017 | Mentovich et al. | |
| 2018/0375579 | A1* | 12/2018 | Oda | G02B 6/26 |
| 2019/0140761 | A1* | 5/2019 | Chan | H04B 10/2589 |
| 2019/0226908 | A1* | 7/2019 | Rao | G01H 9/004 |
| 2020/0257040 | A1* | 8/2020 | Chen | G02B 6/42 |
| 2020/0266894 | A1* | 8/2020 | Shen | H04L 41/0896 |
| 2020/0389248 | A1* | 12/2020 | Goto | H04J 14/02 |
| 2021/0341668 | A1* | 11/2021 | Swanson | A61B 1/07 |

OTHER PUBLICATIONS

Chen et al., "Demonstration of Full System Reaches of 100G SR4, 40G sWDM, and 100G CWDM4 Transmissions over Universal Fiber", 2016 IEEE Photonics Conference (IPC), pp. 597-598, Oct. 2-6, 2016.

Chen et al., "Universal Fiber for Both Short-reach VCSEL Transmission at 850 nm and Single-mode Transmission at 1310 nm", 2016 Optical Fiber Communications Conference and Exhibition (OFC), pp. 1-3, Mar. 20-24, 2016.

"Protected Gold," Data Sheet, Pleiger Laseroptik GmbH + Co. KG, pp. 1-1, year 2012.

Chen et al., "Universal Fiber for Short-Distance Optical Communications," Journal of Lightwave Technology, vol. 37, No. 2, pp. 389-395, Jan. 15, 2019.

Liu et al., "Graded-Index Seven-Core Fiber Optimized for High Density and Ultra-Wideband Parallel Transmission Application," OFC 2018, OSA 2018, Optical Society of America, pp. 1-3, year 2018.

Becker et al., U.S. Appl. No. 16/928,045, filed Jul. 14, 2020.
Kalavrouziotis et al., U.S. Appl. No. 16/928,037, filed Jul. 14, 2020.
U.S. Appl. No. 16/928,045 Office Action dated May 17, 2021.
U.S. Appl. No. 16/928,037 Office Action dated Sep. 20, 2021.
U.S. Appl. No. 16/928,037 Office Action dated Dec. 1, 2021.
U.S. Appl. No. 16/928,045 Office Action dated Dec. 6, 2021.

* cited by examiner

COMMUNICATION BETWEEN DATA CENTERS USING A MULTI-CORE FIBER

FIELD OF THE INVENTION

The present invention relates generally to optical communication, and particularly to system for transmitting and receiving optical communication signals at high data rates using wavelength division multiplexing (WDM).

BACKGROUND OF THE INVENTION

Systems optimized for particular applications in optical communications have been previously proposed in the patent literature. For example, U.S. Pat. No. 9,485,048 describes space-time domain interconnection network architectures with wavelength domain overlay to overcome power consumption issues, especially at low utilization, by exploiting all-optical implementations with active elements which act simultaneously as a switch and an amplifier, and the possibility to remain in an idle state when unused. In one embodiment, time-compressed wavelength division multiplexing (WDM) packets are used on network interface cards through passive wavelength-striped mapping.

As another example, U.S. Pat. No. 8,725,001 describes an optical data link that includes first and second pluralities of transmission devices, at least one of which is configured as an array. A multichannel transmission link has a first end connected to the first plurality of transmission devices and a second end connected to the second plurality of transmission devices so as to form a plurality of parallel transmission channels therebetween. The multichannel transmission link includes a multicore fiber connected directly to the at least one plurality of transmission devices, with the individual cores of the multicore fiber aligned with respective devices in the at least one plurality of transmission devices. Additionally described are access networks and core networks incorporating a transmission link comprising at least one span of a multicore fiber. Further described is a scheme, according to a further aspect of the invention, for using a tapered multicore connector (TMC) to form space-division multiplexing (SDM), WDM and polarization-division multiplexing (PDM) multi-span MCF transmissions.

SUMMARY OF THE INVENTION

An embodiment of the present invention that is described hereinafter provides a system for optical communication, the system including a pair of network devices, a universal multi-core fiber (UMCF) interconnect, and a pair of wavelength-division multiplexing (WDM) devices. Each network device includes (i) first optical communication devices configured to communicate first optical signals having a first carrier wavelength and (ii) second optical communication devices configured to communicate second optical signals having a second carrier wavelength. The universal multi-core fiber (UMCF) interconnect includes multiple cores that are configured to convey the first optical signals and the second optical signals between the network devices, using single-mode propagation for the first optical signals and multi-mode propagation for the second optical signals. Each WDM device is connected between a respective network device and the UMCF interconnect and configured to couple the first and second optical communication devices of the respective network device to the cores in accordance with a defined channel assignment.

In some embodiments, the channel assignment specifies that (i) at least one of the cores conveys, in the same core, both a first optical signal having the first carrier wavelength and a second optical signal having the second carrier wavelength, and (ii) any of the cores conveys one of the first optical signals and one of the second optical signals.

In some embodiments, the first carrier wavelength is between 1260 nm and 1360 nm and the second carrier wavelength is between 780 nm and 950 nm.

In an embodiment, each of the WDM devices includes one or more dichroic beam splitters, which are coupled to the cores of the UMCF interconnect and are configured to steer the first optical signals and the second optical signals at different directions.

In another embodiment, the system further includes an optical-to-optical connector configured to connect the cores to one of the WDM devices.

In some embodiments, the pair of network devices are located at one of a same data center and at different data centers.

In some embodiments, the network devices are network switches.

In an embodiment, each of the WDM devices includes one or more optical circulators, which are coupled to the cores of the UMCF interconnect and are configured to steer the first optical signals and the second optical signals at different directions.

In another embodiment, each of the WDM devices includes one or more arrayed-waveguide grating (AWG) devices, which are coupled to the cores of the UMCF interconnect and are configured to steer the first optical signals and the second optical signals at different directions.

In some embodiments, at least one of the first and second optical signals is time domain multiplexed (TDM).

The is additionally provided, in accordance with another embodiment of the present invention, a method for optical communication, the method including communicating between a pair of network devices (i) first optical signals having a first carrier wavelength, and (ii) second optical signals having a second carrier wavelength. The first optical signals and the second optical signals are conveyed between the network devices over a universal multi-core fiber (UMCF) interconnect, using single-mode propagation for the first optical signals and multi-mode propagation for the second optical signals. Using a pair of wavelength-division multiplexing (WDM) devices, each WDM device connected between a respective network device and the UMCF interconnect, the first and second optical communication devices of the pair of network devices are coupled to the cores in accordance with a defined channel assignment.

The present invention will be more fully understood from the following detailed description of the embodiments thereof, taken together with the drawings in which:

DETAILED DESCRIPTION OF EMBODIMENTS

Overview

Figure 1:
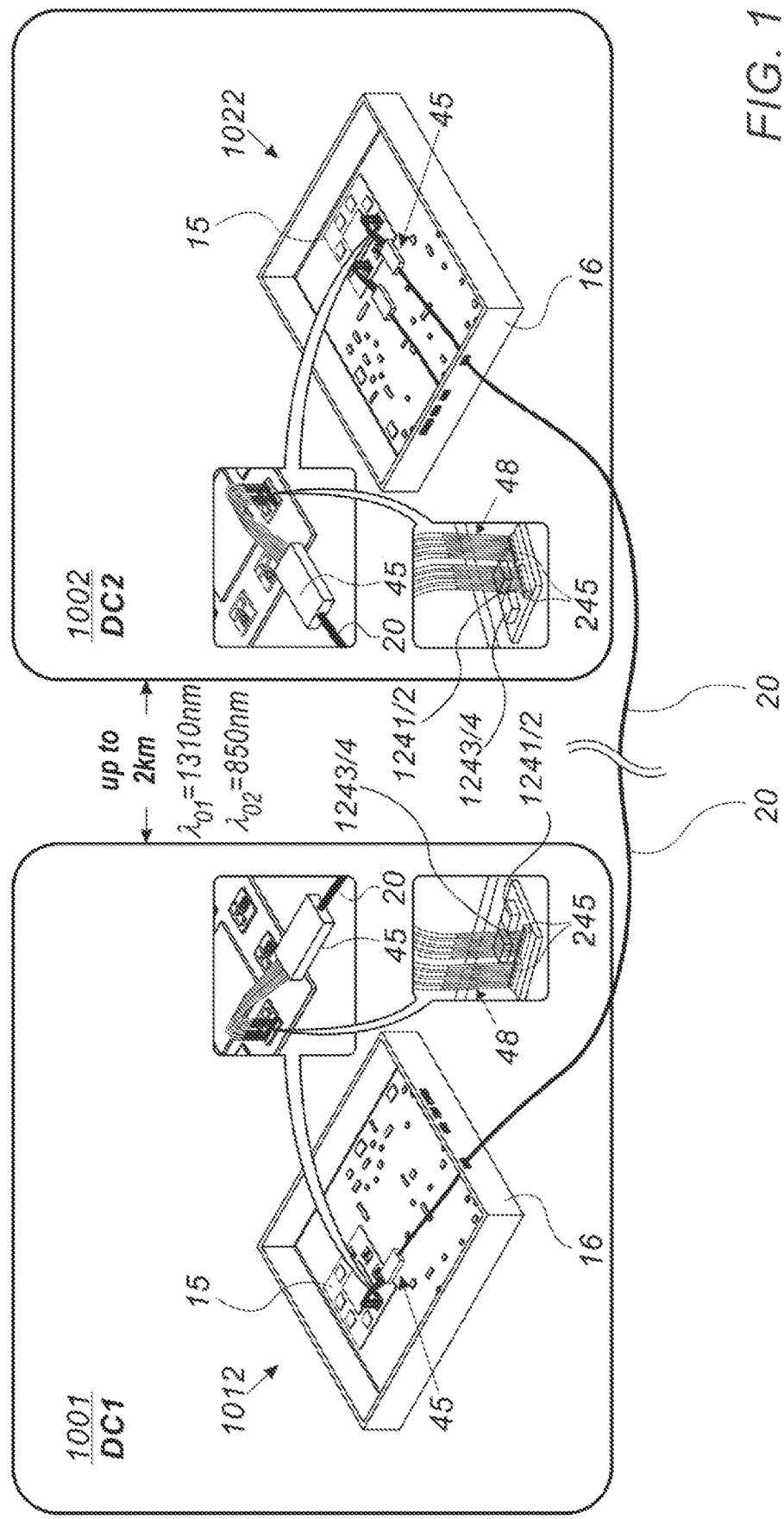
FIG. 1 is a schematic, pictorial isometric view of an inter-data center (DC) bi-directional communication system, in accordance with an embodiment of the present invention.

Modern data center (DC) networks typically use different types of optical fiber interconnects between DCs (inter-DC interconnects). For example, separate optical fiber systems may be used for bi-directional 1310 nm links and for bi-directional 850 nm links to establish full inter-DC links. Such an implementation, however, requires a large number of different types of optical single-mode (SM) fibers and multimode (MM) fibers, resulting in a shortage of physical space inside data centers as well as complex interconnect schemes.

Embodiments of the present invention that are described hereinafter provide systems and methods that enable simultaneous bi-directional communication between a pair of network devices using (i) a dual-wavelength dual-mode multi-core fiber (SM/MM MCF) interconnect, the fiber named hereinafter "universal MCF (UMCF)," and (ii) wavelength division and multiplexing (WDM) devices coupled at both ends of the UMCF to enable the dual-wavelength functionality. The disclosed techniques are particularly suitable for use in inter-data center networks, but are nevertheless also applicable in intra-data center networks.

In an embodiment, the disclosed UMCF is designed and configured to replace both SM fibers for 1310 nm transmission, and MM fibers for 850 nm transmission, in data center environments. Formally, the 1310 nm transmission window is called the O-band and is defined as spanning between 1260 nm and 1360 nm. Any transmission using a carrier wavelength included in the O-band is therefore considered a 1310 nm transmission. The 850 nm transmission window may cover a range of carrier wavelengths between 780 nm to 950 nm, depending on the device in use. Therefore, any transmission using a carrier wavelength between 780 nm and 950 nm is considered hereinafter as a 850 nm transmission.

An example UMCF is described in U.S. patent application Ser. No. 16/928,045, filed Jul. 14 2020, titled, "Intra Data Center and Inter Data Center Links using Dual-Wavelength Multimode/Single-mode Multi-Core Fiber," which is assigned to the assignee of the present invention and whose disclosure is incorporated herein by reference.

The disclosed WDM devices are configured to couple optical communication devices in each of the network devices (e.g., switches) to the cores of the UMCF in accordance with a channel assignment in which (i) at least one of the cores conveys optical signals having different carrier wavelengths (e.g., 1310 nm and 850 nm), and (ii) each of the cores conveys one optical signal of a same carrier wavelength.

The disclosed bi-directional solutions are designed to connect to various transmit and receive geometries of optical communication devices of a network device, such as geometries of surface emitting laser (e.g., VCSELs) arrays and of avalanche photodiode (APD) arrays, respectively. In an embodiment, MT assemblies are used to couple conventional linear arrays of either transmit devices (e.g., to a VCSEL array on chip) or receive devices (e.g., to an APD array on chip) to the WDM device. To this end, lenslet arrays are used. The optical communication devices may be realized as electro-optic circuits on multi-chip modules (MCM).

A fan-in/fan-out assembly is used, on another port of the WDM device, to couple the WDM device to the UMCF using a lenslet array.

In the embodiment, each core of the disclosed UMCF interconnect is configured to support both MM transmission and SM transmission, with minimal insertion losses when coupled (via the WDM device) at 1310 nm to the MT connector assemblies comprising an SMF-28 model SM of a fiber or when coupled at 850 nm to MT connector assemblies comprising a standard OM4 model of an MM fiber.

The UMCF may be coupled to the fan-in/fan-out coupler in each of the network devices using all-optical connectors fitted on a panel of the network device, or it can be directly coupled to the fan-out/fan-in coupler.

Enclosure realizations of transceiver devices with data center terminations are described, for example, in U.S. patent application Ser. No. 16/928,037, filed Jul. 14, 2020, titled "High Density Optical I/O Inside a Data Center Switch using Multi-Core Fibers," which is assigned to the assignee of the present invention and whose disclosure is incorporated herein by reference.

In an embodiment, each of the WDM devices comprises one or more dichroic beam splitters, each of which is coupled (e.g., using a lenslet array) to the cores of the UMCF interconnect and are configured to steer one wavelength optical signal (e.g., 1310 nm) and the other wavelength optical signal (e.g., 850 nm) in different directions.

When compared to conventional bi-directional optical communication architectures that use numerous stand-alone single-core MM and SM fibers, the disclosed UMCF bi-direction interconnect may enable an increase in data-traffic rates between network devices of data centers while decreasing interconnect complexities and maintenance efforts of such DC networks.

System Description

FIG. 1 is a schematic, pictorial isometric view of an inter-data center (DC) bi-directional communication layout, in accordance with an embodiment of the present invention. In the shown embodiment, two data centers DC1 1001 and DC2 1002 are located approximately 2 kilometers apart. A network switch 1012 in data center 1001 is bi-directionally connected with a UMCF interconnect 20 to a network switch 1022 in data center 1002. In UMCF 20 interconnect, optical signals at $\lambda_{o1}$=1310 nm are conveyed by propagating SM guided waves, and optical signals at $\lambda_{o2}$=850 nm are conveyed by propagating MM guided waves.

Switches 1012 and 1022 each comprise a multi-chip module (MCM) 15 assembled inside the switch enclosure. MCM 15 comprises satellite electro-optical (EO) chips 1241/2 and 1243/4 that undertake the electro-optical conversion. Satellite EO chips 1241/2 and 1243/4 include, for example, lasers, modulators, detectors and respective driving electronics. Any type of electro-optical chip could work in this concept (VCSEL, Silicon Photonics, III-V, etc.). In the shown embodiment, the optical I/O layout of the EO chips efficiently matches a fan-in fiber bundle. Lenslet arrays, seen in FIG. 2, perform necessary optical collimation.

Figure 2:
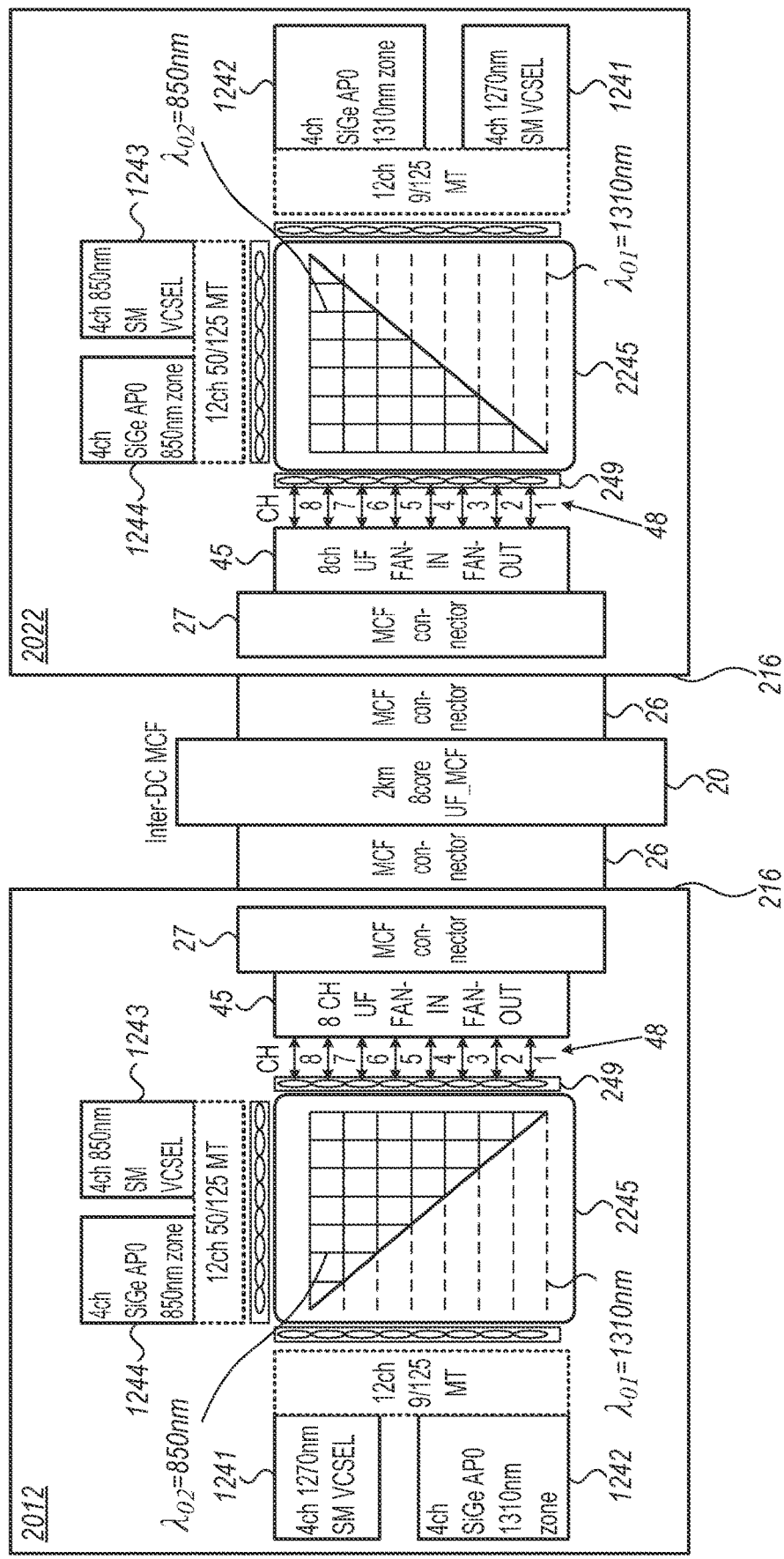
FIG. 2 is a schematic, pictorial block diagram of the inter-data center (DC) communication system of FIG. 1, including a channel assignment scheme, in accordance with an embodiment of the present invention.

Each of switches 1012 and 1022 comprises a respective WDM device 245. WDM devices 245 split, in each switch, the dual-wavelength signals carried at each of the optical fibers (as conveyed from a core of UMCF 20) between EO transceiver chips 1241/2 operating at a first carrier wavelength $\lambda_{o1}$=1310 nm and EO transceiver chips 1243/4 operating at a second carrier wavelength $\lambda_{o2}=850$ nm. EO chips 1241/2 and 1243/4 comprise VCSELs and APDs configured to transmit and detect optical signals at the respective carrier frequencies. Additional details of the EO chips and the WDM devices are shown in FIG. 2.

In the shown embodiment, each switch enclosure comprises a panel 16 that accepts the UMCF 20 interconnect to link the switch using direct coupling (i.e., an approach that does not use a panel connector) to a fan-in/fan-out coupler 45 inside the enclosure. Fan-in/fan-out couplers 45 split the cores of the UMCF into individual regular single core optical fibers of MT assemblies 48.

In another embodiment, each panel 16 of switches 1012 and 1022 comprises one optical-to-optical connector (shown in FIG. 2) to mate the external fiber infrastructure of UMCF 20 to an internal interconnect that can also be a short piece of a UMCF (like UMCF 20). Such connectors couple UMCF fibers directly on both sides, without any electro-optical conversion, and without resorting to the above direct coupling approach of the external UMCF 20 interconnects. In this way, a switch can be provided that is ready to accept a UMCF 20 interconnect into a switch connector. Moreover, using optical-to-optical connectors allows, for example, assembly of a switch for any type of fiber other than UMCF 20 inside an enclosure.

The disclosed use of UMCFs in network devices is not limited to a specific UMCF coupling approach. Any coupling approach that ensures good matching between the optical I/O of an electro-optical chip and the UMCF can be used, some of which are described in the aforementioned U.S. patent application Ser. Nos. 16/928,045 and 16/928,037.

The isometric view shown in FIG. 1 is chosen purely for the sake of conceptual clarity. While the shown embodiment is of a switch enclosure, the disclosed layout holds also for MCMs inside an NIC enclosure or a server. While the shown embodiment has a single MCF 20 interconnect, actual devices may include a larger number of MCFs 20, for example to interconnect multiple satellite EO chips of different switches.

Elements of the switch that are not mandatory for understanding the disclosed techniques, such as electrical amplification stages, are omitted from the figure for simplicity of presentation. For example, switches 1012 and 1022 may be further configured to time domain multiplex (TDM) at least one of the first and second optical signals.

Finally, while the embodiments disclosed in FIG. 1 are for MCM systems, the disclosed techniques are applicable, mutatis mutandis, to embedded optical modules (EOM) (e.g., Coalition for On-Board Optics—COBO) which, unlike MCMs, are placed on the main board rather than the main ASIC substrate. For such modules, MCFs could be still used to connect the EOM to the panel.

Channel Assignment Scheme

FIG. 2 is a schematic, pictorial block diagram of the channel assignment scheme of the inter-data center (DC) bi-directional communication layout of FIG. 1, in accordance with an embodiment of the present invention. The shown scheme supports 16 channels that are realized with eight physical cores and two wavelengths per core. This layout enables a four-channel communication per direction per wavelength between data centers that are located about two kilometers apart.

As seen, switches 2012 of DC1 and 2022 of DC2 are linked using a UMCF 20 interconnect coupled on its two ends to all-optical MCF connectors 26 that are located on panels 216 of the switches. Each fiber core simultaneously conveys both 1310 nm and 850 nm signals, but do not convey signals from two sources with the same wavelength.

Inside the switches, short UMCF 27 interconnects convey the optical signals to fan-in/fan-out couplers 45, having at their other end MT assemblies 48 coupled to convey signals on eight separate single-core optical fibers. The optical fibers are optically collimated using lenslet arrays 249 and are coupled to one facet of a commercially available dichroic beam splitter 2245, that reflects the 850 nm collimated optical signals, while being transparent to the 1310 nm collimated signals. In this embodiment, dichroic beam splitters 2245 are regarded as the WDM devices coupled to switches 2012 and 2022.

In the shown arrangement, the bi-directional uplink/downlink uses two pairs of a four-channel MT assembly. The transceiver arrays 1241/2 and 1243/4 are linear arrays, whose fiber connections are based on the aforementioned standardized SMF-28-based MT assemblies for 1310 nm and in standardized OM4-based MT assemblies for 850 nm and are optically collimated using lenslet arrays, such as array 249 to be coupled to dichroic beam splitter 2245.

To provide more specific details, one facet of each of the dichroic beam splitters 2245 is coupled, via the SMF-28-based 9/125 MT assemblies, to array 1241 of single mode 1270 nm VCSELs, operating at one of the O-band WDM wavelengths, and to array 1242 of 1310 nm SiGe APDs, each integrated with associated driver and TIA ICs, respectively.

An orthogonal facet of each of dichroic beam splitters 2245 is coupled, via the OM4-based 50/125 MT assemblies, to array 1243 of single mode 850 nm VCSELs, operating at one of the CDM wavelengths, and to array 1244 of 850 nm SiGe APDs, each integrated with associated driver and TIA ICs.

Linear array 1241 is an array of VCSELs transmitting at 1270 nm and linear array 1242 is an array of SiGe APDs that detect 1270 nm signals. The arrays are ordered such that an array transmitting from switch 2012 is received in switch 2022, and vice versa (i.e., in a bi-directional communication scheme).

Similarly, linear array 1243 is an array of VCSELs transmitting at 850 nm and linear array 1244 is an array of SiGe APDs that detects 850 nm signals. The arrays are also ordered such that an array transmitting from switch 2012 is received in switch 2022, and vice versa (i.e., in a bi-directional communication scheme).

Another embodiment of the present invention utilizes optical circulators, instead of a dichroic beam splitter, as the WDM device. This embodiment (not shown) can also be used for duplex transmission within one core of the MCF with both optical signals residing either in the 850 nm band or in the 1310 nm band. The dichroic beam splitter approach for generating bi-directional optical traffic is, however, preferred over the optical circulator approach, since it can be used over a very broad wavelength range, while circulators are designed for a wavelength range of 20 nm at 850 nm and 100 nm at 1310 nm. Using the dichroic beam splitter approach for broadband duplex transmission also decreases optical crosstalk in the link.

In yet another embodiment, WDM is performed using one or more arrayed-waveguide grating (AWG) devices.

Using either of the two WDM embodiments shown above, various combinations of single-mode transmission wavelengths and multimode transmission wavelengths, and MCF lengths can be used for various link lengths from 100 m up to 10 km.

The embodiment shown in FIG. 2 is brought by way of example. Other elements and other coupling methods may be used. For example, the shown SiGe APDs can be replaced by InGaAs PDs for the receive circuitries to measure optical signals conveyed either at 850 nm or 1310 nm. Another possible coupling approach has the EO chip transmitters/receivers arranged in octal geometry that matches that of the UMCF, with the cores of the UMCF imaged with a lens onto the transmitters/receivers.

Figure 3:
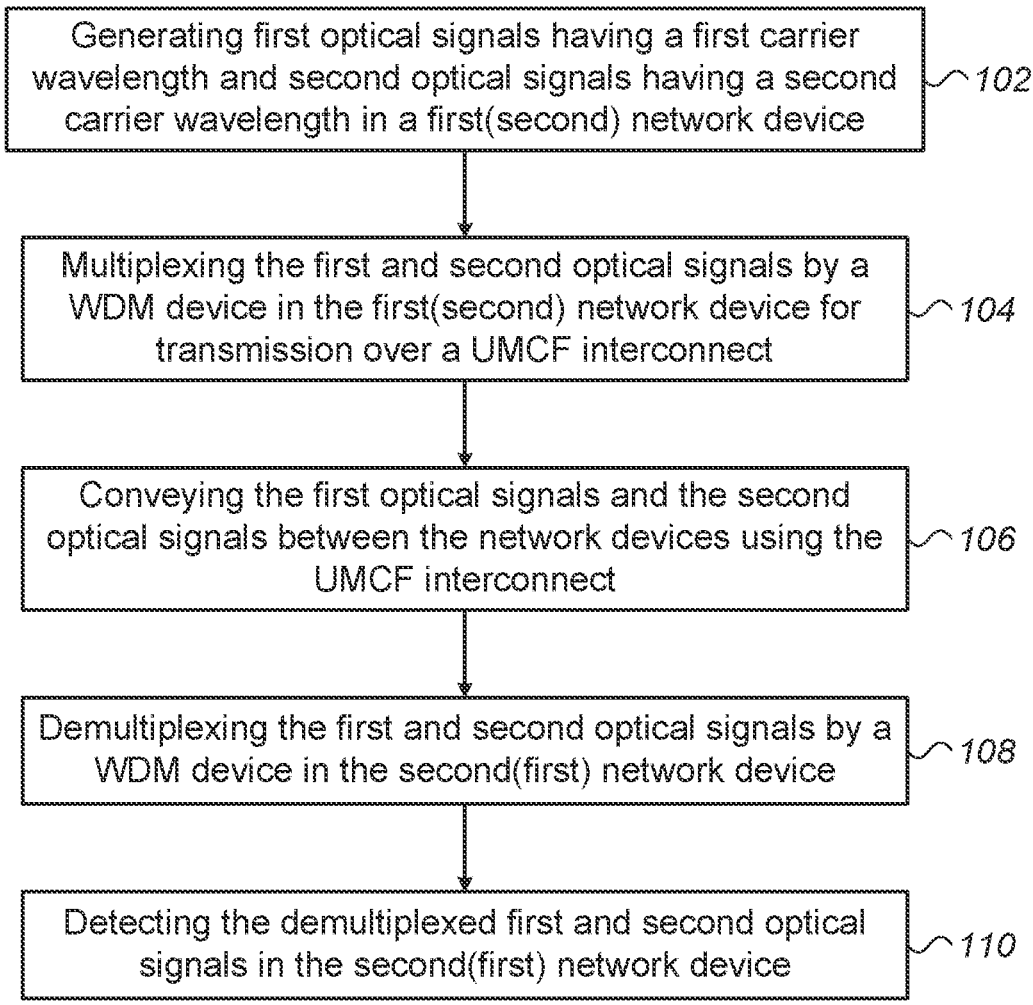
FIG. 3 is a flow chart schematically describing a method of optical bi-directional communication in the inter-data center (DC) communication system of FIG. 2, in accordance with an embodiment of the present invention.

FIG. 3 is a flow chart schematically describing a method of optical bi-directional communication in the inter-data center (DC) layout of FIG. 2, in accordance with an embodiment of the present invention. The process includes an optical communication initiation step 102 in which first wavelength (e.g., 1310 nm) signals and second wavelength (e.g., 850 nm) signals are generated in each of the network devices (e.g., switches 2012 and 2022) to be communicated between the two network devices.

At a multiplexing step 104, the generated 1310 nm signals and 850 nm signals are multiplexed in each of the network devices by a WDM device to be transmitted to receivers using UMCF 20 interconnect.

At a signal conveying step 106, the coupled 1310 nm signals and 850 nm signals are conveyed over UMCF 20 cores, as described above.

At a demultiplexing step 108, the transmitted 1310 nm signals and 850 nm signals are demultiplexed in each of the network devices by a WDM device. Finally, at a detection step 110, the 1310 nm and 850 nm signals are detected at the network devices. The above description holds for two-way communication (i.e., the aforementioned bi-directional scheme).

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for optical communication, comprising:
a pair of network devices, each network device comprising:
  (i) first optical communication devices configured to communicate first optical signals having a first carrier wavelength between 1260 nm and 1360 nm; and
  (ii) second optical communication devices configured to communicate second optical signals having a second carrier wavelength between 780 nm and 950 nm;
a universal multi-core fiber (UMCF) interconnect, which comprises multiple cores that are configured to convey the first optical signals and the second optical signals between the network devices, using single-mode propagation for the first optical signals and multi-mode propagation for the second optical signals; and
a pair of wavelength-division multiplexing (WDM) devices, each WDM device connected between a respective network device and the UMCF interconnect and configured to couple the first and second optical communication devices of the respective network device to the cores in accordance with a defined channel assignment, such that at least one the multiple cores is coupled to both one of the first optical communication devices and one of the second optical communication devices.

2. The system according to claim 1, wherein the defined channel assignment specifies that (i) at least one of the multiple cores conveys, both a first optical signal having the first carrier wavelength and a second optical signal having the second carrier wavelength, and (ii) any of the cores conveys one of the first optical signals and one of the second optical signals.

3. The system according to claim 1, wherein each of the WDM devices comprises one or more dichroic beam splitters, which are coupled to the cores of the UMCF interconnect and are configured to steer the first optical signals and the second optical signals at different directions.

4. The system according to claim 1, and comprising an optical-to-optical connector configured to connect the cores to one of the WDM devices.

5. The system according to claim 1, wherein the pair of network devices are located at one of a same data center and at different data centers.

6. The system according to claim 1, wherein the network devices are network switches.

7. The system according to claim 1, wherein each of the WDM devices comprises one or more optical circulators, which are coupled to the cores of the UMCF interconnect and are configured to steer the first optical signals and the second optical signals at different directions.

8. The system according to claim 1, wherein each of the WDM devices comprises one or more arrayed-waveguide grating (AWG) devices, which are coupled to the cores of the UMCF interconnect and are configured to steer the first optical signals and the second optical signals at different directions.

9. The system according to claim 1, wherein at least one of the first and second optical signals is time domain multiplexed (TDM).

10. A method for optical communication, comprising:
communicating between a pair of network devices (i) first optical signals having a first carrier wavelength between 1260 nm and 1360 nm, and (ii) second optical signals having a second carrier wavelength between 780 nm and 950 nm;
conveying the first optical signals and the second optical signals between the network devices over a universal multi-core fiber (UMCF) interconnect, using single-mode propagation for the first optical signals and multi-mode propagation for the second optical signals; and
using a pair of wavelength-division multiplexing (WDM) devices, each WDM device connected between a respective network device and the UMCF interconnect, coupling the first and second optical communication devices of the pair of network devices to the cores in accordance with a defined channel assignment, such that at least one of the multiple cores is coupled to both one of the first optical communication devices and one of the second optical communication devices.

11. The method according to claim 10, wherein the defined channel assignment specifies that (i) at least one of the multiple cores conveys, both a first optical signal having the first carrier wavelength and a second optical signal having the second carrier wavelength, and (ii) any of the cores conveys one of the first optical signals and one of the second optical signals.

12. The method according to claim 10, wherein coupling the first and second optical communication devices comprises, in each of the WDM devices, steering the first optical signals and the second optical signals at different directions using one or more dichroic beam splitters, which are coupled to the cores of the UMCF interconnect.

13. The method according to claim 10, wherein conveying the first optical signals and the second optical signals between the network devices comprises conveying signals between pair of network devices that are located at one of a same data center and at different data centers.

14. The method according to claim 10, and comprising using an optical-to-optical connector to connect the cores to one of the WDM devices.

15. The method according to claim 10, wherein the network devices are network switches.

16. The method according to claim 10, wherein coupling the first and second optical communication devices comprises, in each of the WDM devices, steering the first optical signals and the second optical signals at different directions using one or more optical circulators, which are coupled to the cores of the UMCF interconnect.

17. The method according to claim 10, wherein coupling the first and second optical communication devices comprises, in each of the WDM devices, steering the first optical signals and the second optical signals at different directions using one or more arrayed-waveguide grating (AWG) devices, which are coupled to the cores of the UMCF interconnect.

18. The system according to claim 10, wherein at least one of the first and second optical signals is time domain multiplexed (TDM).

* * * * *